(12) United States Patent
Barron et al.

(10) Patent No.: US 9,713,223 B2
(45) Date of Patent: Jul. 18, 2017

(54) AUTOMATED CALIBRATION OF LED LUMINAIRES BASED ON COLOR COORDINATES

(71) Applicant: Vital Vio, Inc., Troy, NY (US)

(72) Inventors: Robert Barron, Troy, NY (US); Robert Rouhani, Troy, NY (US); Jorel Lalicki, Troy, NY (US); James W. Peterson, Troy, NY (US)

(73) Assignee: Vital Vio, Inc., Troy, NY (US)

( * ) Notice: Subject to any disclaimer, the term of this patent is extended or adjusted under 35 U.S.C. 154(b) by 0 days.

(21) Appl. No.: 15/200,284

(22) Filed: Jul. 1, 2016

(65) Prior Publication Data

US 2017/0006685 A1 Jan. 5, 2017

Related U.S. Application Data

(60) Provisional application No. 62/187,890, filed on Jul. 2, 2015.

(51) Int. Cl.
*H05B 37/02* (2006.01)
*H05B 33/08* (2006.01)

(52) U.S. Cl.
CPC ..... *H05B 33/0869* (2013.01); *H05B 33/0851* (2013.01); *H05B 37/0227* (2013.01)

(58) Field of Classification Search
CPC ........... H05B 33/0869; H05B 33/0851; H05B 37/0227
USPC ....................................................... 315/151
See application file for complete search history.

(56) References Cited

U.S. PATENT DOCUMENTS

2014/0265868 A1* 9/2014 Morrisseau ........ H05B 33/0842
315/151

\* cited by examiner

*Primary Examiner* — Daniel D Chang
(74) *Attorney, Agent, or Firm* — Hoffman Warnick LLC

(57) ABSTRACT

Disclosed is a method of automatically calibrating a luminaire including at least one light emitting diode (LED) engine, the LED engine including a plurality of LEDs and a controller for driving the at least one LED engine. The method comprises acquiring an image of light emitted from each LED of the LED engine, first determining whether each LED has a predetermined intensity for a color of the LED, first adjusting each LED that does not have the predetermined intensity to have the predetermined intensity for the color of the LED, measuring, by a spectrometer, a color spectrum of a combined light of the LED engine, the color spectrum including a plurality of measured color spectrums, second determining whether a variation exists between each of the plurality of measured color spectrums and a predetermined color spectrum of a control data unit, and second adjusting at least one LED to correct variation.

8 Claims, 5 Drawing Sheets

AUTOMATED CALIBRATION OF LED LUMINAIRES BASED ON COLOR COORDINATES

TECHNICAL FIELD DISCLOSURE

The present disclosure concerns methods of automatically calibrating luminaires including at least one light emitting diode (LED) engine and a controller for driving the at least one LED engine. Generally, the disclosure relates to methods of determining the functionality and operational values of LEDs within the LED engine and measuring light output of the LED. Each LED or groups of LEDs can be adjusted based on these determinations and measurements.

BACKGROUND OF THE DISCLOSURE

Through the delivery of specific wavelengths of light, particular effects can be accomplished, such as inactivation of bacteria, fungi, or viruses, facilitation of chemical reactions (e.g., curing of plastics or other materials), generation of heat, and conversion of light wavelength to an alternative wavelength.

White light is generally composed of multiple wavelengths of light from across the visible spectrum. White light is perceived, in part, by the sensitization of the S, M, and L cones (short, medium, and long, respectively) of the human eye. The S, M, and L cones react to wavelengths most commonly described as blue, green, and red, respectively. When a light source generates wavelengths in each of these cones at proper intensities, white light is perceived by the human eye. To perceive white light, all three cone types must be stimulated.

A conventional method to achieve the stimulation involves using a combination of light emitting diodes (LEDs) with different colors of emitted light. One challenge in manufacturing LED luminaires is that the LEDs frequently appear to have the wrong spectral output after manufacturing. When multiple LEDs are used in a luminaire, the combination of the differences can be amplified. When individual LEDs are manufactured, they sometimes go through certain quality control techniques, however, these quality control techniques usually only measure limited features of the LEDs, such as correlated color temperature (CCT) rating, which effectively measures how 'warm' (e.g., a red/orange appearance) or 'cool' (e.g., a blueish appearance) they appear. Through this process, the individual LEDs are separated by the CCT, which is referred to as binning. Different bins of LEDs, though, will often have slight differences from batch to batch, which can be discernible during use.

BRIEF DESCRIPTION OF THE DISCLOSURE

Embodiments of the disclosure disclosed herein may include a method of automatically calibrating a luminaire including at least one light emitting diode (LED) engine, the LED engine including a plurality of LEDs and a controller for driving the at least one LED engine. The method includes acquiring an image of light emitted from each LED of the LED engine; first determining whether each LED has a predetermined intensity for a color of the LED; first adjusting each LED that does not have the predetermined intensity to have the predetermined intensity for the color of the LED; measuring, by a spectrometer, a color spectrum of a combined light of the LED engine, the color spectrum including a plurality of measured color spectrums; second determining whether a variation exists between each of the plurality of measured color spectrums and a predetermined color spectrum of a control data unit; and second adjusting at least one LED to correct variation.

BRIEF DESCRIPTION OF THE DRAWINGS

These and other features of the disclosure will be more readily understood from the following detailed description of the various aspects of the disclosure taken in conjunction with the accompanying drawings that depict various aspects of the disclosure.

Figure 1:
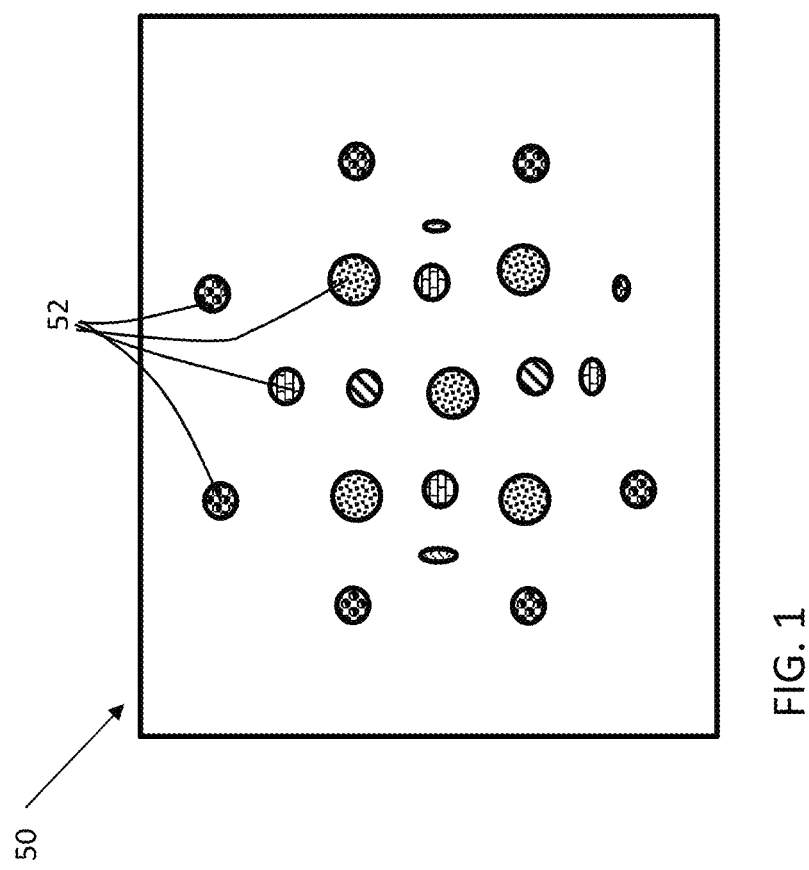
FIG. 1 shows an image of an LED engine outputting light, the LED engine to be calibrated according to embodiments of the invention.

It is noted that the drawings may not be to scale. The drawings are intended to depict only typical aspects of the disclosure, and therefore should not be considered as limiting the scope of the disclosure. In the drawings, like numbering represents like elements between the drawings. The detailed description explains embodiments of the disclosure, together with advantages and features, by way of example with reference to the drawings.

DETAILED DESCRIPTION OF THE DISCLOSURE

Figure 2:
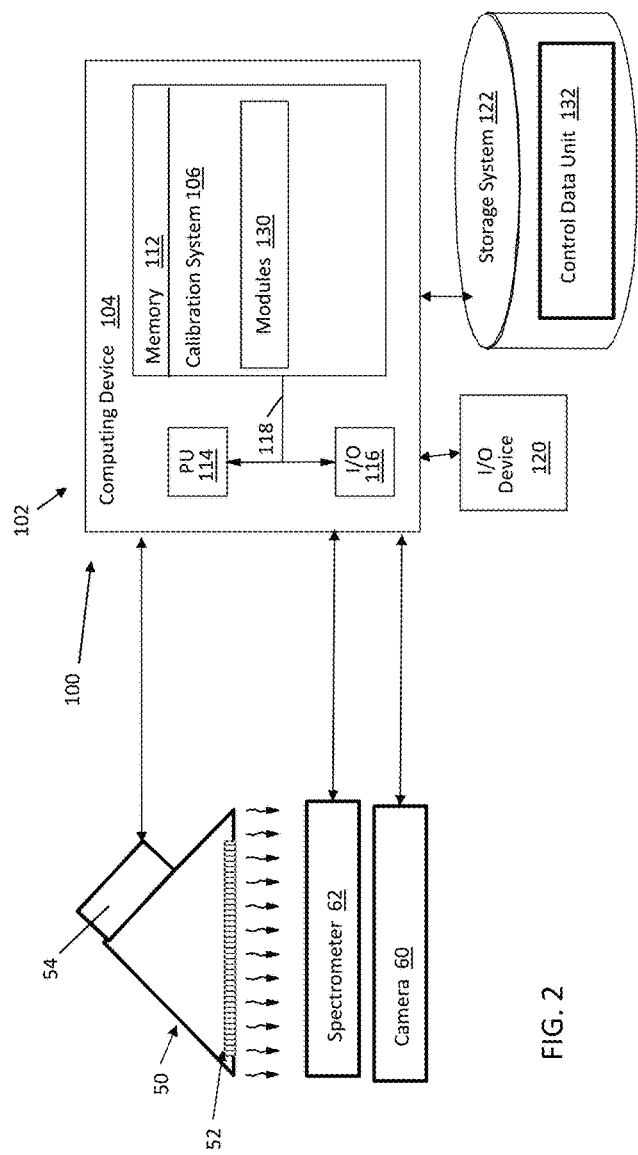
FIG. 2 shows a schematic block diagram of an LED engine and a calibration system according to some embodiments of the disclosure.

Disclosed herein is a method and system for automatically calibrating a luminaire. As used herein, a luminaire refers to any lighting device or lighting fixture now known or later developed using LEDs. In some embodiments, a luminaire can include at least one light emitting diode (LED) engine. FIG. 1 shows an image of an LED engine 50 outputting light, the LED engine 50 to be calibrated. FIG. 2 shows a calibration system 100 according to some embodiments of the disclosure. As shown in FIGS. 1 and 2, an LED engine 50 can comprise a plurality of LEDs or LED modules 52 (individual round elements in FIG. 1) and as shown in FIG. 2, an LED driver or controller 54, either integrated or separate from the LEDs or LED modules 52. In some embodiments, the LEDs 52 may comprise different colors, illustrated by different shading of circles in FIG. 1. For instance, any combination of red, green, blue, amber, and/or violet LEDs may be utilized. There may be one or a plurality of LEDs 52 of each color. It should be understood that when combining colors, each color may include a different number of LEDs 52 than the other colors, or the same number of LEDs 52 of the color. In some embodiments, the luminaire that includes one or more LED engines 50 may further include a controller (not shown) for driving LED engine(s).

According to embodiments, a method of automatically calibrating a luminaire including one or more LED engines 50 allows for nearly any color temperature or specific color of light by adjusting for faults from LED binning, as well as providing specific and regular control of a light output of the luminaire. Differences in independent LEDs 52 or groups of LEDs 52 are obviated using methods according to some embodiments. The brightness and color coordinate of each individual LED 52 of the LED engine or engines 50, and the output of the entire luminaire, are independently managed using these embodiments. The disclosed methods allow for creating light of a consistent color temperature such that an observer would not likely be capable of noticing a difference between two different luminaires. An added advantage to automated calibration is an increase in production of luminaires, eliminating the need for an engineer or the like to calibrate each luminaire manually and eliminating any guesswork involved in the process. The calibration methods described herein are not simply automated according to current embodiments, but allow for greater control than conventional techniques.

With further reference to FIG. 2, calibration system 100 in accordance with the disclosure will now be described in more detail. System 100 is shown implemented on a computer 102 as computer program code. To this extent, computer 102 is shown including a memory 112, a processor 114, an input/output (I/O) interface 116, and a bus 118. Further, computer 102 is shown in communication with an external I/O device/resource 120 and a storage system 122. In general, processor 114 executes computer program code, such as system 100, that is stored in memory 112 and/or storage system 122. While executing computer program code, processor 114 can read and/or write data to/from memory 112, storage system 122, and/or I/O device 120. Bus 118 provides a communication link between each of the components in computer 102, and I/O device 120 can comprise any device that enables user to interact with computer 102 (e.g., keyboard, pointing device, display, etc.).

Alternatively, a user can interact with another computing device (not shown) in communication with computer 102. In this case, I/O interface 116 can comprise any device that enables computer 102 to communicate with one or more other computing devices over a network (e.g., a network system, network adapter, I/O port, modem, etc.). The network can comprise any combination of various types of communications links. For example, the network can comprise addressable connections that may utilize any combination of wireline and/or wireless transmission methods. In this instance, the computing devices (e.g., computer 102) may utilize conventional network connectivity, such as Token Ring, Ethernet, WiFi or other conventional communications standards. Further, the network can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

Computer 102 is only representative of various possible combinations of hardware and software. For example, processor 114 may comprise a single processing unit, or be distributed across one or more processing units in one or more locations, e.g., on a client and server. Similarly, memory 112 and/or storage system 122 may reside at one or more physical locations. Memory 112 and/or storage system 122 can comprise any combination of various types of computer-readable media and/or transmission media including magnetic media, optical media, random access memory (RAM), read only memory (ROM), a data object, etc. I/O interface 116 can comprise any system for exchanging information with one or more I/O devices. Further, it is understood that one or more additional components (e.g., system software, math co-processor, etc.) not shown in FIG. 1 can be included in computer 102. To this extent, computer 102 can comprise any type of computing device such as a network server, a desktop computer, a laptop, a handheld device, a mobile phone, a pager, a personal data assistant, etc. However, if computer 102 comprises a handheld device or the like, it is understood that one or more I/O devices (e.g., a display) and/or storage system 122 could be contained within computer 102, not externally as shown.

As discussed further below, system 100 is shown including a calibration system 106 including various modules 124 that carry out functions as described herein. While storage system 122 can include a variety of data, one particular data element includes a control data unit 132 representative of an acceptable quality color spectrum for an LED engine.

Figure 3:
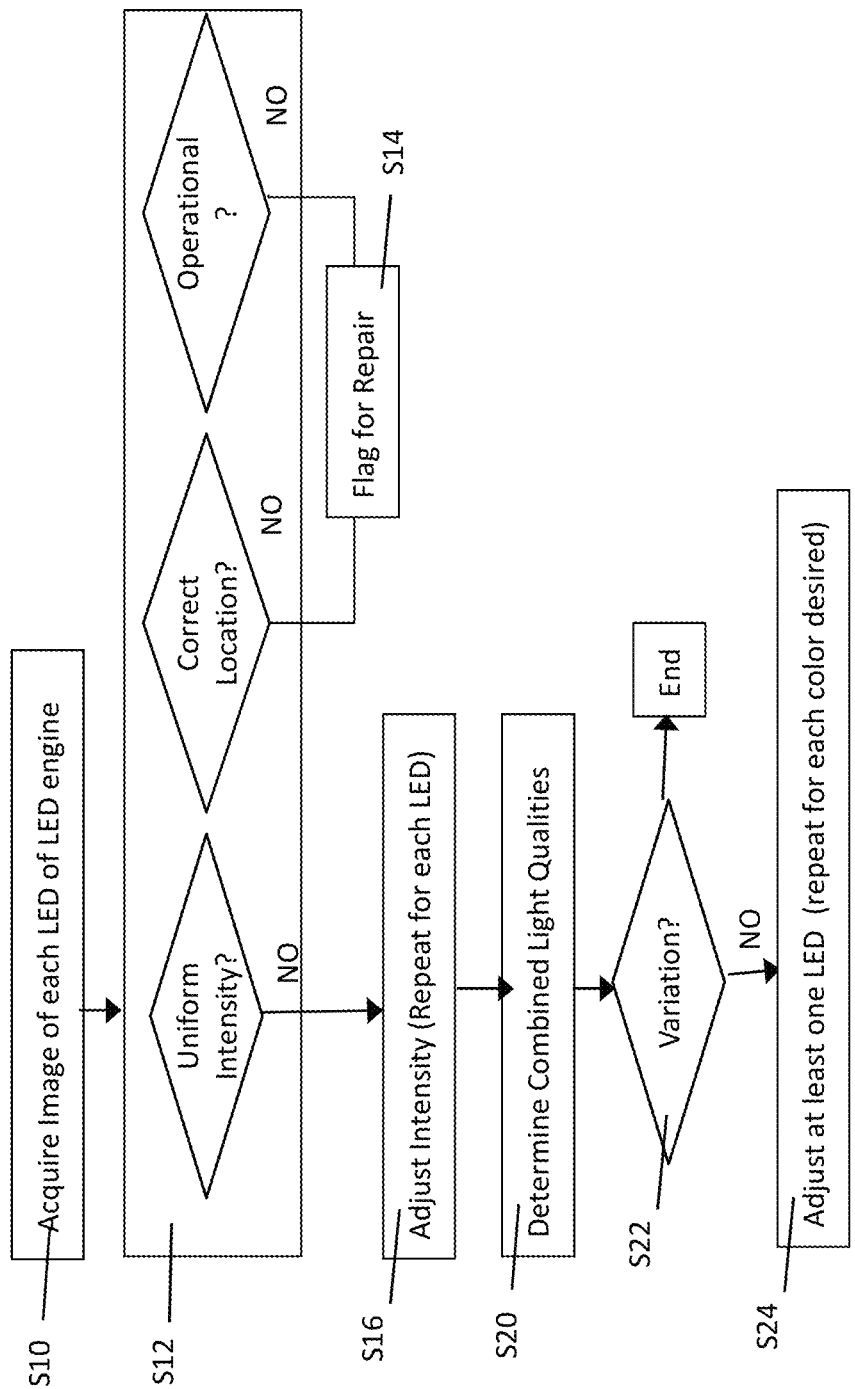
FIG. 3 shows a flowchart of a method according to some embodiments of the disclosure.

As shown in FIG. 3, a method according to some embodiments may include, in step S10, acquiring an image of light output from each LED of the LED engine. An example image is shown in FIG. 1. This image may be acquired by any image capture device, including but not limited to the use of a camera 60, such as a digital camera. This image may be acquired prior to installation of the LED engine in a luminaire or after the LED engine is installed in, or assembled as, a luminaire. If the luminaire includes multiple LED engines, an image of the emitted light from LEDs of each LED engine can be captured. A camera or other image capture device can be integrated into the luminaire to capture images after assembly of the luminaire. In some embodiments, as shown in FIG. 2, the acquiring is controlled by calibration system (computing device) 100, which can control, e.g. camera 60, spectrometer 62, controller 54, etc.

Using the acquired image, in step S12, calibration system 100 may make a number of determinations regarding each LED 52. In one example, calibration system 100 determines whether each LED 52 has a predetermined (desired) intensity for a color of the LED. In this step, the intensity of each LED 52 (indicated by size of circle/oval in FIG. 1) can be compared with other LEDS of the same color or a standard (control) LED of that color to determine whether the LED has the predetermined intensity. To perform this comparison, data or a color spectrum previously measured, which is representative of light emitted by the other LEDs of the same color, or of the control LED, can be stored in storage system 122 (FIG. 2). All or some of the LEDs 52 can be evaluated. In this fashion, the uniformity of the intensity of the LEDs 52 collectively can be obtained.

In other optional embodiments, in step S12, calibration system 106 may also determine whether each LED 52 is operational, and in a correct location. To determine if an LED is in the correct location and is the correct color, one color of LED in the LED engine can be turned on at a time, or software can be used to create a bandpass filter to display only one color at a time. If, for example, no light is observed from an LED 52, it may be considered inoperable and flagged for repair/replacement, step S14. Similarly, if the LED is of the wrong color for its location, it can be flagged for repair/replacement, step S14. The color of light in the image may also not fit a pattern of intended lights. FIG. 1 shows the light output of an example LED engine 50 at LEDs 52, wherein particular-colored LEDs are arranged in a certain pattern. It should be understood that any geometric shape may be utilized in such a pattern, and any combination of LEDs 52 may be utilized. In any case, using the image to evaluate if each LED 52 is in the intended location, can also determine if the LEDs 52 are in the appropriate pattern.

In step S16, calibration system 106 may adjust the intensity of any LED 52 in LED engine 50, e.g., by adjusting a setting of controller 54. In this fashion, the intensity of each LED 52 can be adjusted, such that each LED 52 of a particular color (and each color) has a uniform intensity. That is, each red LED may be required to be a particular intensity, each violet LED may be required to be a particular intensity that is different or the same as the red LED intensity, and so on for LEDs of any other color in the particular luminaire. Steps S12-16 can be repeated for each LED 52.

These initial determinations facilitate adjusting for nearly any differences in individual LEDs 52 due to binning, manufacturing flaws, or any other differences in individual LEDs. Previous methods have not utilized a feedback loop as discussed above, to measure and adjust the color of light emitted from each LED in turn, until the color of light emitted from each LED matches a control. Previous methods also have not taken into account the operation, location, and intensity of each LED 52 of an LED engine 50. As such, according to some embodiments, each LED 52 is made uniform for each color of a luminaire, removing a large portion of the color variations perceived in previous methods of calibration.

Following these determinations, at step S20, calibration system 106 determines one or more qualities of combined light emitted from LED engine 50. The combined light emitted from LED engine 50 is a mixed light of light emitted from each LED 52. This determination can be done after the above adjustments (or after installation of the luminaire and may be independent of the above disclosed determinations or done in combination). In certain embodiments, the determinations may be made, in part, by measurement with a spectrometer 62 or other optical measurement devices, such as, but not limited to, one or multiple of a photodiode, a photocell, a quantum sensor, a radiometer, a pyranometer, a photodetector, a phototransistor, or a photoelectric sensor. For instance, spectrometer 62 can measure a color spectrum of the combined light or of each color of LED used. A total area of a color spectrum for each color can be determined. The color spectrum indicates at least the intensity of the combined light across the determined wavelength band, be it the broad visible spectrum, or a narrower band (e.g., a band for each color of LED used, or a band including the desired combined light wavelengths). Using this measurement and/or other optical measuring devices, several further parameters of the combined light can be determined, such as color coordinates for the combined light or for each color of LED used in the luminaire, a correlated color temperature (CCT) for the combined light or for each color of LED used in the luminaire, a color rendering index (CRI) value for the combined light or for each color of LED used in the luminaire, a lumen output value for the combined light or for each color of LED used in the luminaire, a gamut value for the combined light or for each color of LED used in the luminaire, and/or a percentage of spectral content in the specific wavelength range for each color. It should be understood that any other color or spectral characteristic may be determined as necessary as part of the overall output, and that all of the measurements necessary for the determinations may be performed at a steady state according to embodiments of the present disclosure, such as a violet or other color setting mode, as well as during dynamic modes such as color changing modes that vary throughout the day or during day and night.

In particular, when determining the qualities of combined light emitted or output from the LED engine or the luminaire, in terms of the intensity and the percentage of spectral content, the peak wavelengths, each indicative of a color such as red, blue, green, amber, and violet, can be measured, and/or a wavelength range indicative of a color can be measured. For any particular peak wavelength or wavelength range indicative of a specified color, the intensity and/or the percentage of the combined light emitted from the LED engine or luminaire can be determined. It should be understood that not every peak or wavelength in the visible spectrum is necessary to be measured, and only some might be measured depending on the purpose of the luminaire and the colors of LEDs used. In some embodiments, the intensity and spectral content of violet, comprising a wavelength range of approximately 380 nanometers (nm) to approximately 420 nm, can be measured. As should be understood, a peak or a wavelength range for a particular color desired can be determined from a spectrum measured by spectrometer 62 or other device, which can be done by calibration system 106.

Figure 4:
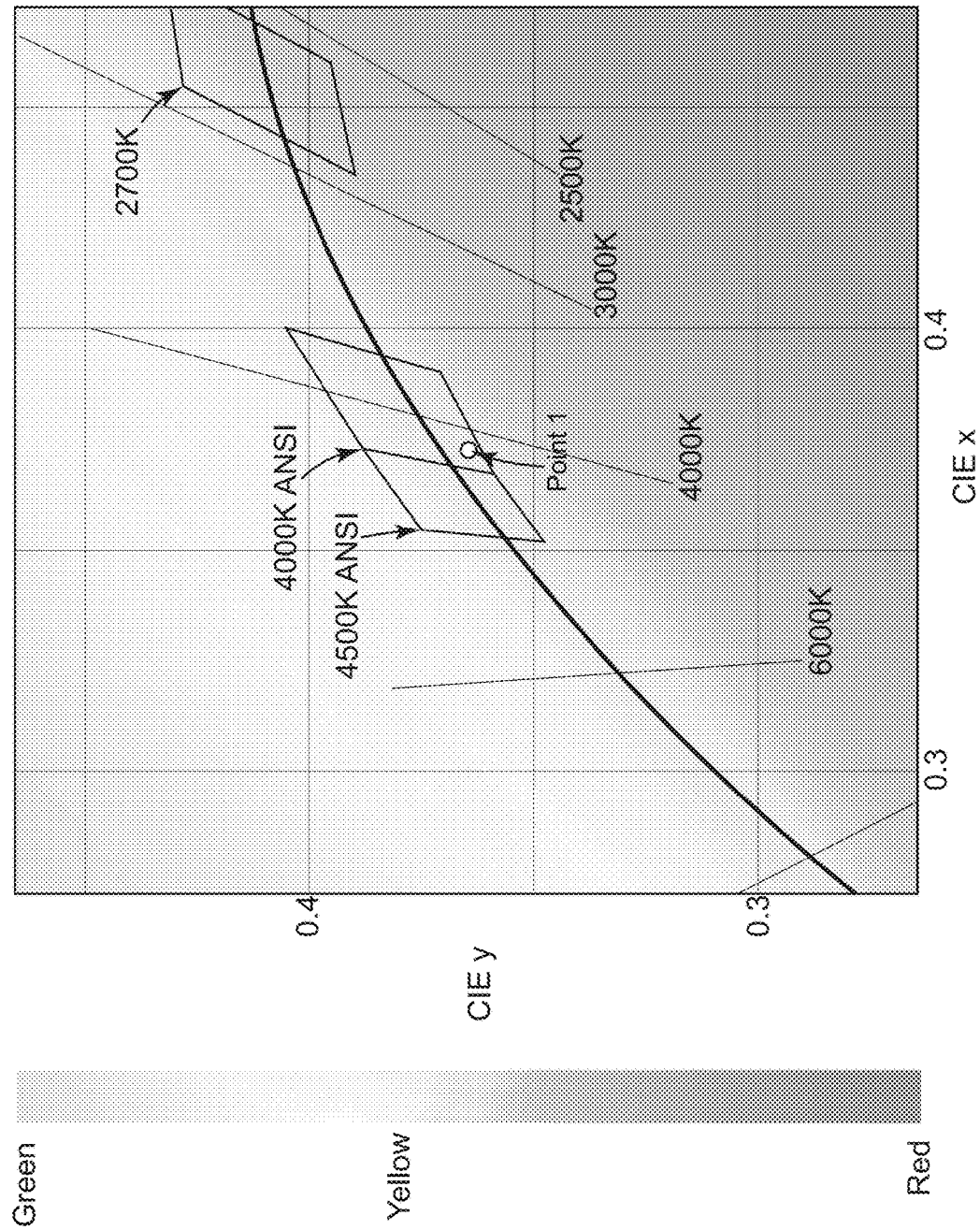
FIG. 4 shows an example International Commission on Illumination (CIE) 1931 xy color space spectrum according to some embodiments of the disclosure.

In some embodiments, the violet wavelength range or peak can be utilized for the inactivation of bacterial pathogens, with light in a range of approximately 380 nm to approximately 420 nm, for example, approximately 405 nm light may be used as the peak wavelength. It should be understood that any wavelength within 380 nm to 420 nm may be utilized, and that the peak wavelength may include a specific wavelength plus or minus approximately 5 nm. In such embodiments, the luminaire may be used for photobiological applications such as in healthcare environments. In such embodiments, the violet wavelength range, or the violet peak, should include 20%, and in some embodiments, at least 40%, of the spectral content of the overall spectrum, as illustrated in FIG. 4.

In additional embodiments, a luminaire can be calibrated for different photobiological applications or for purposes other than photobiological, such as horticulture, different types of therapeutic, and other applications. For example, luminaires may be calibrated for delivering particular wavelength ranges besides the violet peak or wavelength ranges, whilst still meeting 'white light' requirements such that the human eye will perceive white light despite the spectral content being higher for particular wavelengths. In some embodiments, lights can be calibrated for horticultural environments by increasing the spectral content of a 400-500 nm range and a 600-720 nm range. In these embodiments, the luminaire can help promote plant growth of any plant or vegetation, including but not limited to aquatic plants, land plants, and air plants, as well as providing benefit to aquatic life. The growth benefit of current embodiments can be greater than that from the same spectral contents observed in incandescent, fluorescent or sodium discharge lamps and luminaires. Advantages of the methods described herein are that the spectral content can be tuned, white light can be delivered despite the changes in spectral content, and the luminaire can be continually adjusted so as to create a consistent light.

Following the determination(s) of step S20, in step S22, calibration system 106 may compare, the measured spectrum(s) of combined light to that of a color spectrum of a control data unit 132 (FIG. 2), i.e., a set of ideal or standard light values. One or more parameters determined from the measured spectrum of combined light can also be compared to similar parameters derived from the control data unit color spectrum and stored in control data unit 132 (FIG. 2). That is, depending on the intended use of the luminaire, a 'control data unit' comprising the optimal values may have been previously determined or a set of measurements may have been created based on a theoretic calculation of the optimal control unit, and stored as control data unit 132 (FIG. 2). The comparison may, in some embodiments, comprise comparing each of a plurality of measured color spectrums (step S20) to a respective color spectrum in control data unit data 132 for the respective color. In step S22, a determination is made regarding whether a variation exists between each of the plurality of measured color spectrums and a predetermined color spectrum of a control data unit. For instance, for each set of parameters above (e.g., CCT, CRI, etc.), either for the combined light, for each color of LED, or for each individual LED, a comparison can be made to a particular 'control' value. A variation can be determined where a color spectrum does not match a predetermined color spectrum, or is not within a particular range thereof, e.g., +/−1%, or where a particular value of a parameter derived from the color spectrum does not match a value of a corresponding parameter in control data unit 132.

In step S24, calibration system 160 adjusts at least one LED 62 to correct any variation, e.g., by changing a setting in controller 54. That is, each LED 52 or groups of the LEDs 52, such as color groupings of the LEDs, may be adjusted in the luminaire. As noted, the adjusting can be achieved using a controller 54, such as shown in FIG. 2. Controller 54 can include any controller now known or later developed. For instance, controller 54 may be a microcontroller included within the luminaire. However, controller 54 may also be separate from the luminaire and in communication with a component of the luminaire. In some embodiments, the above disclosed calibration system 106 may operate controller 54, for instance by programming or reprogramming the controller. The calibration system 106 may be wired directly to controller 54 and the luminaire, or a wireless connection may be utilized by the calibration system 106 for operating controller 54 and LED engine 50.

In embodiments utilizing a calibration system 106 for operating controller 54, a feedback loop may be utilized for adjusting the LEDs 52. In these embodiments, calibration system 106 can periodically or continuously poll spectrometer 62 for the color coordinates and adjust accordingly. For instance, the measuring, determining variation, and adjusting (S20-S24) of the LEDs 52 may be done individually, in groups based on the colors used, or as a whole unit. These steps can be repeated periodically as often as desired to be sure the color spectrum is precisely what is intended for the unit. In some embodiments, each color of LED 52 is measured, compared, and adjusted independently at a different time from the other colors. In such an embodiment, the other colors of LED may be turned off, but for such a short time that it is imperceptible to the human eye.

In any event, the adjustments are made in order to bring the light into characteristics necessary for the intended use of the luminaire. In some embodiments, as illustrated in FIG. 4, a desired light output of the luminaire comprises a white light defined by at least one of: a CRI value of more than approximately 50, and a CCT value between approximately 1000K and approximately 8000K. In some embodiments, a portion of LED engine 50 excluding a violet peak comprises: an xy coordinate on a CIE 1931 xy color space diagram above a black body curve within a bounded area defined by y=2.23989x−0.382773, y=1.1551x−0.195082. FIG. 4 shows the effects of individual color LED variations on the overall output.

In some embodiments, the CRI value may include at least 55, 60, 65, or at least 70. In further embodiments, the CRI value may include at least 80, 85, 90, or at least 95, plus or minus approximately 5. Further, white light can be defined as light with a correlated color temperature (CCT) value of approximately 1000 kelvin (K) to approximately 8000K, or in some embodiments approximately 2000K to approximately 6000K, wherein approximately can include plus or minus about 200K, or plus or minus about 500K.

Figure 5:
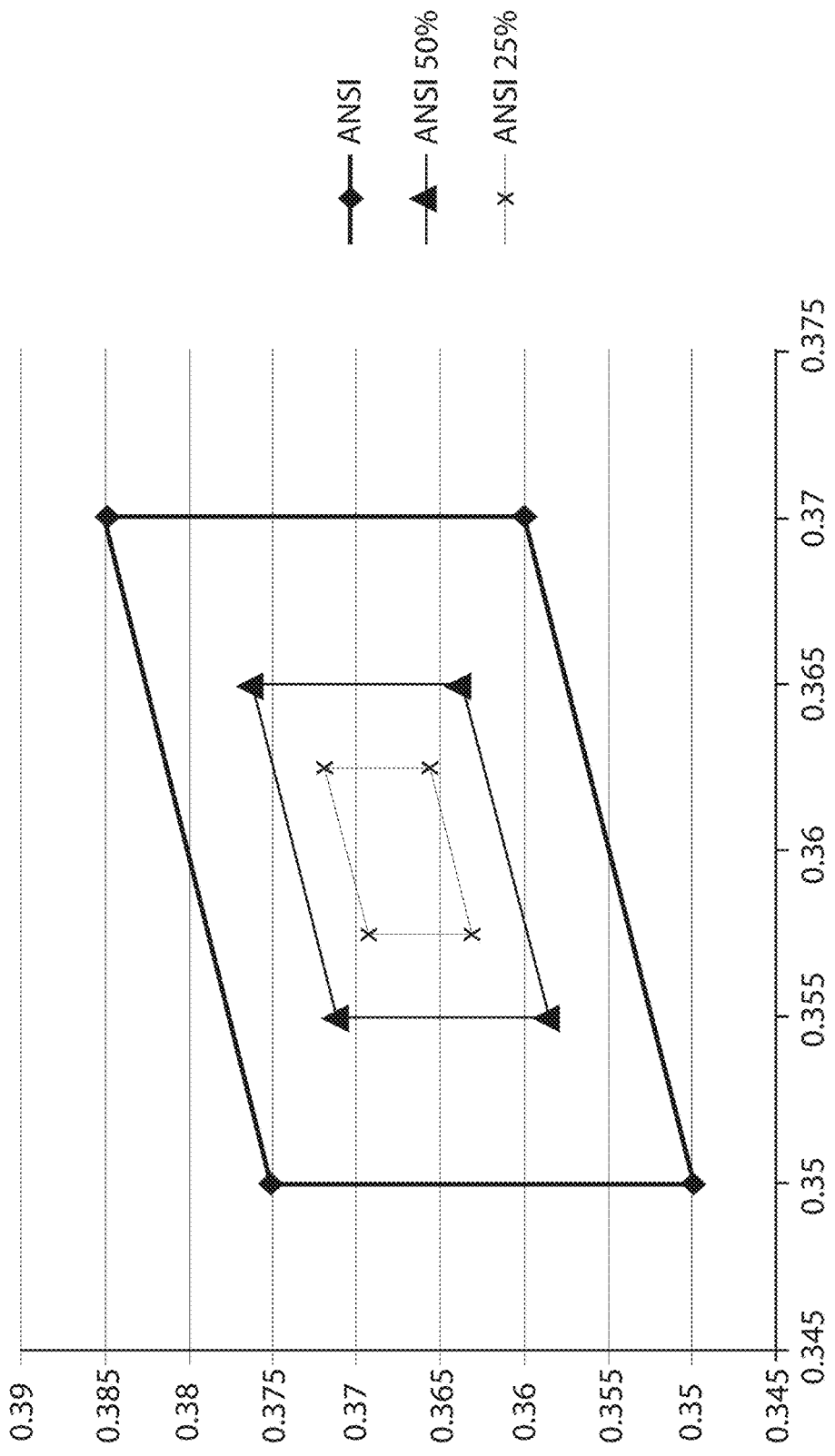
FIG. 5 shows example ANSI standard color coordinate bounds according to some embodiments of the disclosure.

FIG. 5 shows the bounds derived from American National Standards Institute (ANSI) 4500K standard for white light. The ANSI bins correspond roughly to a 4-step McAdams ellipse. Each step of a McAdams ellipse corresponds to one standard deviation, which is a boundary in which the human eye cannot perceive the difference between two colors inside of the ellipse. Anywhere past two steps is a deviation at which most humans notice a slight difference. That is, the ANSI 4500K standard typically allows for noticeable differences in light. Accordingly, the bounds used according to embodiments of the present disclosure typically correspond to at least less than a 3 step McAdam ellipse, or bounds that are 50% of the size of the ANSI standard for production units. Accordingly, methods according to some embodiments result in LED engines 50 with unperceivable differences between them. While the ANSI 4500K standard is described and referred to, it should be understood that other ANSI standards exist and are equally applicable.

Further embodiments include a lighting device with at least one first-element that emits visible light at a wavelength and intensity sufficient to inactivate one or more pathogenic bacterial species, at least one second-element that emits light of one or more different wavelengths to that of the first-element, wherein the at least one first, bacteria inactivating, element and at least one second element are such that the combined output of the light source is white or a shade of white, and a controller for automatically calibrating the first-element and the second-element according to the above disclosed methods.

In some embodiments, there is disclosed a lighting device with at least one first-element that emits visible light at a wavelength and intensity sufficient to inactivate one or more pathogenic bacterial species in the air and on contact surfaces and materials, at least one second-element that emits light of different wavelengths to that of the first-element, wherein the at least one first element is operable in a first mode to emit light having an irradiance in a first range, and in a second mode to emit light having an irradiance in a second, different range, and a calibration device for automatically calibrating the at least one first-element and the at least one second-element according to any of the methods above disclosed.

Further embodiments include a lighting device with at least one first-element that emits visible light at a wavelength and intensity sufficient to inactivate one or more pathogenic bacterial species, at least one second-element that emits light of different wavelengths to that of the first-element, wherein the at least one second element is operable to provide environmental illumination and a calibration device for automatically calibrating the at least one first-element and the at least one second-element according to any of the methods above disclosed.

The foregoing description of various aspects of the disclosure has been presented for the purpose of illustration and description. It is not intended to be exhaustive or to limit the disclosure to the precise form disclosed, and obviously, many modifications and variations are possible. Such variations and modifications that may be apparent to one skilled in the art are intended to be included within the scope of the present disclosure as defined by the accompanying claims.

What is claimed:
1. A method of automatically calibrating a luminaire including at least one light emitting diode (LED) engine, the

LED engine including a plurality of LEDs and a controller for driving the at least one LED engine, the method comprising:
  acquiring an image of light emitted from each LED of the LED engine;
  first determining whether each LED has a predetermined intensity for a color of the LED;
  first adjusting each LED that does not have the predetermined intensity to have the predetermined intensity for the color of the LED;
  measuring, by a spectrometer, a color spectrum of a combined light of the LED engine, the color spectrum including a plurality of measured color spectrums;
  second determining whether a variation exists between each of the plurality of measured color spectrums and a predetermined color spectrum of a control data unit;
  second adjusting at least one LED to correct any variation;
  third determining at least one of a group consisting of a total area of a color spectrum for each color, a color coordinate, a correlated color temperature (CCT), a color rendering index (CRI) value, a lumen output value, a gamut value, an intensity of each color in a specific wavelength range, and a percentage of spectral content in the specific wavelength range for each color;
  fourth determining whether a variation exists between the at least one of a group consisting of a total area of a color spectrum for each color, a color coordinate, a correlated color temperature (CCT), a color rendering index (CRI) value, a lumen output value, a gamut value, an intensity of each color in a specific wavelength range, and a percentage of spectral content in the specific wavelength range for each color and corresponding control data of a control data unit; and
  third adjusting at least one LED to correct any variation.

2. The method of claim 1, wherein the image acquiring includes using a camera.

3. The method of claim 1, wherein the first adjusting includes using the controller to adjust the at least one LED engine.

4. The method of claim 1, wherein the measuring, second determining, and second adjusting are repeated periodically for each LED.

5. The method of claim 1, wherein the intensity and the percentage of spectral content are measured for light comprising a violet peak and a wavelength range of approximately 380 nanometers (nm) to 420 nm.

6. The method of claim 5, wherein the specific wavelength range for each color further includes at least one of a group including: a red peak, a blue peak, a green peak, and an amber peak.

7. The method of claim 1, wherein the combined light comprises: a white light comprising at least one of: a CRI value of more than approximately 50, and a CCT value between approximately 1000K and approximately 8000K; and wherein a portion of the LED engine excluding a violet peak comprises: an xy coordinate on a CIE 1931 xy color space diagram above a black body curve within a bounded area defined by $y=2.23989x-0.382773$, $y=1.1551x-0.195082$.

8. A calibration system comprising:
  a computer including a memory, a processor, and an input/output (I/O);
  an external I/O device in communication with the computer;
  a storage system in communication with the computer, the storage system comprising a control data unit;
  a calibration program code stored in the memory and configured to be executed by the processor;
  an optical measurement device operably coupled to the processor;
  a camera operably coupled to the processor; and
  a controller for controlling each light emitting diode (LED) of a LED engine, and operably coupled to the processor,
  the calibration program code configured to be executed by the processor to:
  instruct the camera to acquire an image of light emitted from each LED of the LED engine;
  first determine whether each LED has a predetermined intensity for a color of the LED;
  first instruct the controller to adjust each LED that does not have the predetermined intensity to have the predetermined intensity for the color of the LED;
  instruct the optical measurement device to measure a color spectrum of a combined light of the LED engine, the color spectrum including a plurality of measured color spectrums;
  second determine whether a variation exists between each of the plurality of measured color spectrums and a predetermined color spectrum stored in a control data unit;
  second instruct the controller to adjust at least one LED to correct any variation;
  third determine at least one of a group consisting of a total area of a color spectrum for each color, a color coordinate, a correlated color temperature (CCT), a color rendering index (CRI) value, a lumen output value, a gamut value, an intensity of each color in a specific wavelength range, and a percentage of spectral content in the specific wavelength range for each color;
  fourth determine whether a variation exists between the at least one of a group consisting of a total area of a color spectrum for each color, a color coordinate, a correlated color temperature (CCT), a color rendering index (CRI) value, a lumen output value, a gamut value, an intensity of each color in a specific wavelength range, and a percentage of spectral content in the specific wavelength range for each color and corresponding control data of a control data unit; and
  third instruct the controller to adjust at least one LED to correct any variation.

* * * * *